(12) United States Patent
Goolsby

(10) Patent No.: US 7,440,454 B1
(45) Date of Patent: Oct. 21, 2008

(54) PACKET RESHUFFLER AND METHOD OF IMPLEMENTING SAME

(75) Inventor: Jeremy B. Goolsby, Longmont, CO (US)

(73) Assignee: XILINX, Inc., San Jose, CA (US)

( * ) Notice: Subject to any disclaimer, the term of this patent is extended or adjusted under 35 U.S.C. 154(b) by 624 days.

(21) Appl. No.: 11/040,399

(22) Filed: Jan. 21, 2005

Related U.S. Application Data

(60) Provisional application No. 60/638,318, filed on Dec. 21, 2004.

(51) Int. Cl.
*H04L 12/28* (2006.01)
(52) U.S. Cl. ...................... 370/389; 370/412
(58) Field of Classification Search .............. 370/389, 370/412, 413, 415, 417, 429, 440, 235; 711/1, 711/2, 3, 100, 108, 200, 202, 209, 220; 710/52, 710/56, 310
See application file for complete search history.

(56) References Cited

U.S. PATENT DOCUMENTS 5,125,083 A * 6/1992 Fite et al. .................... 712/207
6,697,330 B1 * 2/2004 Melvin et al. ............... 370/235
6,728,210 B1 * 4/2004 El-Khoury et al. .......... 370/231

OTHER PUBLICATIONS

Xilinx, Inc.; "Virtex-II Platform FPGA Handbook"; published Dec. 2000; pp. 33-75, available from Xilinx, Inc., 2100 Logic Drive, San Jose, California 95124.
Rapidio Trade Association, "RapidIO™ Interconnect Specification", Rev. 1.2, Jun. 2002, 274 pages, available from RapidIO Trade Association, Suite 325, 3925 W. Braker Lane, Austin, TX 78759.

* cited by examiner

*Primary Examiner*—Chirag G Shah
*Assistant Examiner*—Nima Mahmoudzadeh
(74) *Attorney, Agent, or Firm*—Robert M. Brush; Justin Liu

(57) ABSTRACT

A packet reshuffler and a method of implementing the same is described. In one example, a digital logic circuit in a transmitter for sending packets stored in a set of buffers includes circular shift register logic, encoder logic, selection logic, and combinatorial logic. The circular shift register logic includes a plurality of registers configured to respectively store a plurality of pointers. Each of the plurality of pointers includes an address of one of the buffers, a priority value, and a type value. The encoder logic is configured to produce a plurality of sets of bits respectively associated with the plurality of pointers. The selection logic is configured to process the plurality of sets of bits to generate a shuffle entry signal associated with a selected one of said plurality of pointers. The combinatorial logic is configured to control the circular shift register logic in response to the shuffle entry signal.

19 Claims, 6 Drawing Sheets

PACKET RESHUFFLER AND METHOD OF IMPLEMENTING SAME

FIELD OF THE INVENTION

One or more aspects of the present invention relate generally to digital logic circuits and, more particularly, to a packet reshuffler and a method of implementing the same.

BACKGROUND OF THE INVENTION

Communication between electronic devices is drawing more attention as the speeds of such electronic devices are increasing. One type of electronic communications architecture for interconnecting electronic devices is the RAPIDIO standard, described in "The RapidIO™ Interconnect Specification," Revision 1.2, June, 2002, published by the RapidIO Trade Association. The RapidIO architecture is configured for interconnecting microprocessors, digital signal processors (DSPs), communications and network processors, system memory, peripheral devices, and the like on a circuit board or several circuit boards using a backplane. The RapidIO architecture provides for packet-switched point-to-point technology for passing data and control information within embedded systems, primarily used in network and communications equipment.

In a RAPIDIO system, two ports are interconnected via a link. Each port has a transmitter and a receiver connected to the other port's receiver and transmitter, respectively. The pair of ports implements flow control to prevent the loss of packets due to a lack of buffer space in a receiver. The flow control mechanism does not use any external arbitration or sideband signaling, but is rather completely in-band.

The RAPIDIO standard implements two flow control mechanisms: a receiver-controlled mechanism and a transmitter-controlled mechanism. In the transmitter-controlled mechanism, physical layer (PHY) logic in a transmitter receives a buffer status packet from a receiver, which indicates the number of packets the receiver can buffer. The PHY logic uses that information to anticipate how many packets the receiver can receive and transmit only that many packets. In addition to anticipating how many packets should be sent, the transmitter-controlled mechanism prioritizes packets that are scheduled to be sent such that the packets are not necessarily sent in the order they were produced.

Notably, each of the packets includes a header having a priority field. The field is normally produced by layers higher than the PHY logic in a transmitter. As the buffers in the receiver are depleted, the transmitter becomes more selective and will utilize the priorities to determine which packet is sent. Priorities range from zero to three, where zero is the lowest priority. In addition, the RAPIDIO standard defines two types of packets: request packets and response packets. Response packets are never assigned the lowest priority, and request packets are never assigned the highest priority. A response packet's priority field may be incremented ("promoted") by the transmitter if necessary to fill the receiver's buffer.

The RAPIDIO standard details several algorithms to implement transmitter-controlled flow control. FIG. 1 is a flow diagram depicting an exemplary algorithm 100 for implementing transmitter-controlled flow control. In the algorithm 100, the transmitter PHY logic includes multiple buffers, each buffer storing a packet. Together, the buffers provide a queue of packets. The algorithm 100 begins at step 101. At step 102, a determination is made as to whether a packet is available in the queue to be sent. If not, the algorithm 100 returns to step 101. If so, at step 104, a determination is made as to whether the transmitter port is using a receiver-controlled flow control mechanism. If so, the next packet in the queue is sent at step 106. Otherwise, at step 108, a determination is made as to whether the next packet in the queue meets a minimum priority. The minimum priority corresponds to a worst-case estimate of the number of free buffers left in the receiver.

If the next packet in the queue meets the minimum priority, that packet is sent at step 110. Otherwise, at step 112, a determination is made as to whether any packet in the queue meets the minimum priority. If so, the oldest packet that meets the minimum priority is placed at the head of the queue at step 114. At step 116, the next packet in the queue is sent (i.e., the oldest packet that meets the minimum priority). If no packet in the queue meets the minimum priority, at step 118, a determination is made as to whether any packet in the queue is a response packet. If so, the oldest response packet is placed at the head of the queue at step 120. At step 122, the oldest response packet is promoted to have the minimum priority. At step 124, the next packet in the queue is sent (i.e., the oldest response packet). If there are no response packets in the queue, the algorithm 100 returns to step 101.

Implementation of the algorithm 100 shown in FIG. 1 at high speeds is difficult. Since the packets may not be transmitted in sequence (due to re-prioritization), "gaps" will be created, where some buffers in the transmitter are empty, but surrounding buffers are still pending. Since packet data is constantly being buffered, there is no bandwidth to "recompact" the buffers. One conventional implementation of the algorithm 100 is to sequentially inspect the packets to determine which packet to transmit using a processor or state machine that checks the packets one-by-one. However, in some high-speed applications, there is no time to sequentially inspect all queued packets to find the next packet to send without inducing a stall. Accordingly, there exists a need in the art for an improved packet re-shuffler and a method of implementing the same.

SUMMARY OF THE INVENTION

A packet reshuffler and a method of implementing the same is described. One aspect of the invention relates to a digital logic circuit in a transmitter for sending packets stored in a set of buffers includes circular shift register logic, encoder logic, selection logic, and combinatorial logic. The circular shift register logic includes a plurality of registers configured to respectively store a plurality of pointers. Each of the plurality of pointers includes an address of a buffer in the set of buffers, a priority value, and a type value. The encoder logic is configured to produce a plurality of sets of bits respectively associated with the plurality of pointers. The selection logic is configured to process the plurality of sets of bits to generate a shuffle entry signal associated with a selected one of said plurality of pointers. The combinatorial logic is configured to control the circular shift register logic in response to the shuffle entry signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 2:
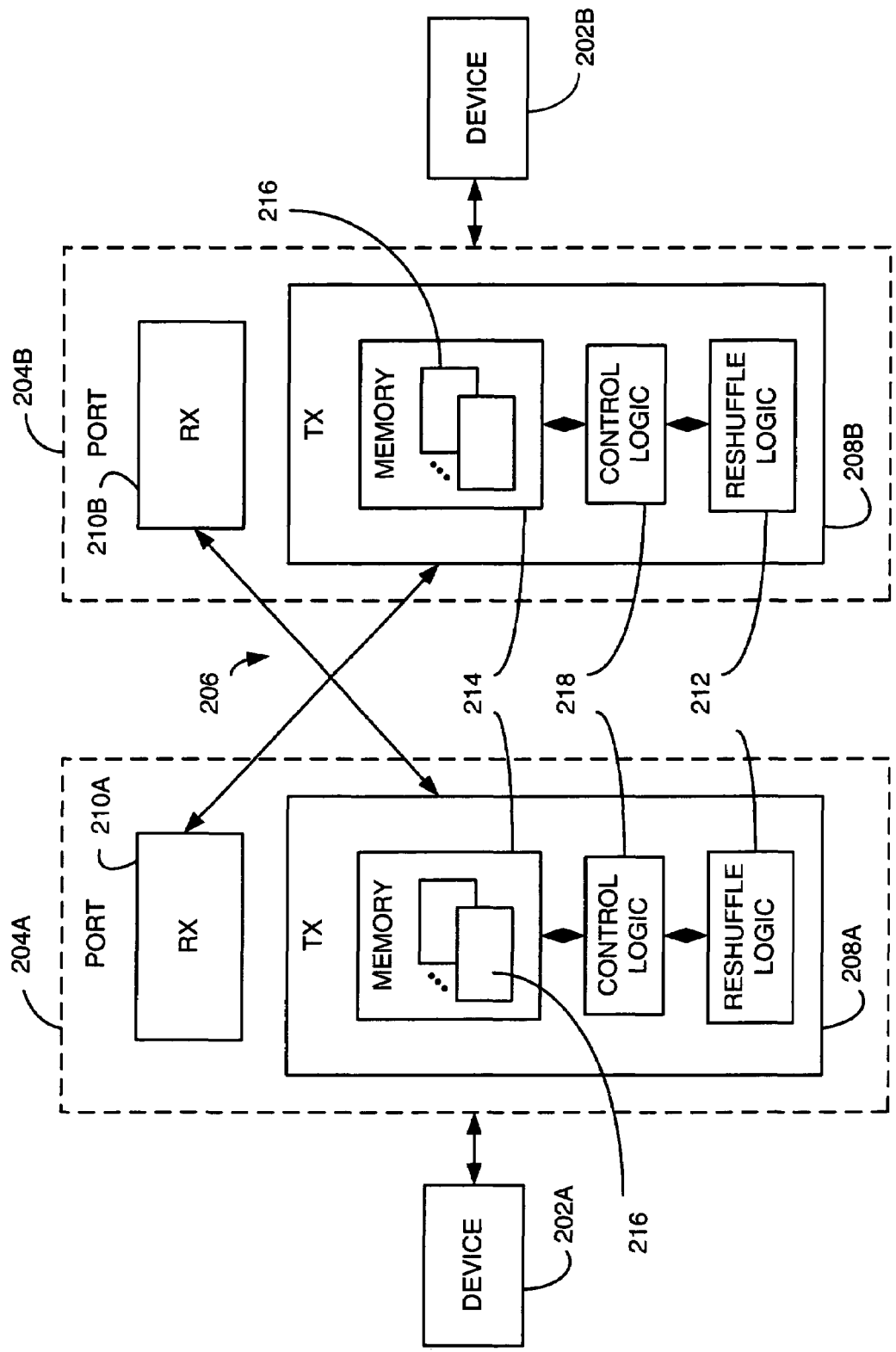
FIG. 2 is a block diagram depicting an exemplary system for communication between electronic devices in which the invention may be employed.

FIG. 2 is a block diagram depicting an exemplary system 200 for communication between electronic devices in which the invention may be employed. The system 200 includes a device 202A in communication with a port 204A, and a second device 202B in communication with a port 204B. The device 202A transmits and receives data from the device 202B over a link 206 using the port 204A. The device 202B transmits and receives data from the device 202A over the link 206 using the port 204B. The port 204A includes a transmitter 208A and a receiver 210A, and the port 204B includes a transmitter 208B and a receiver 210B. The transmitter 208A is in communication with the receiver 210B, and the receiver 210A is in communication with the transmitter 208B.

Figure 1:
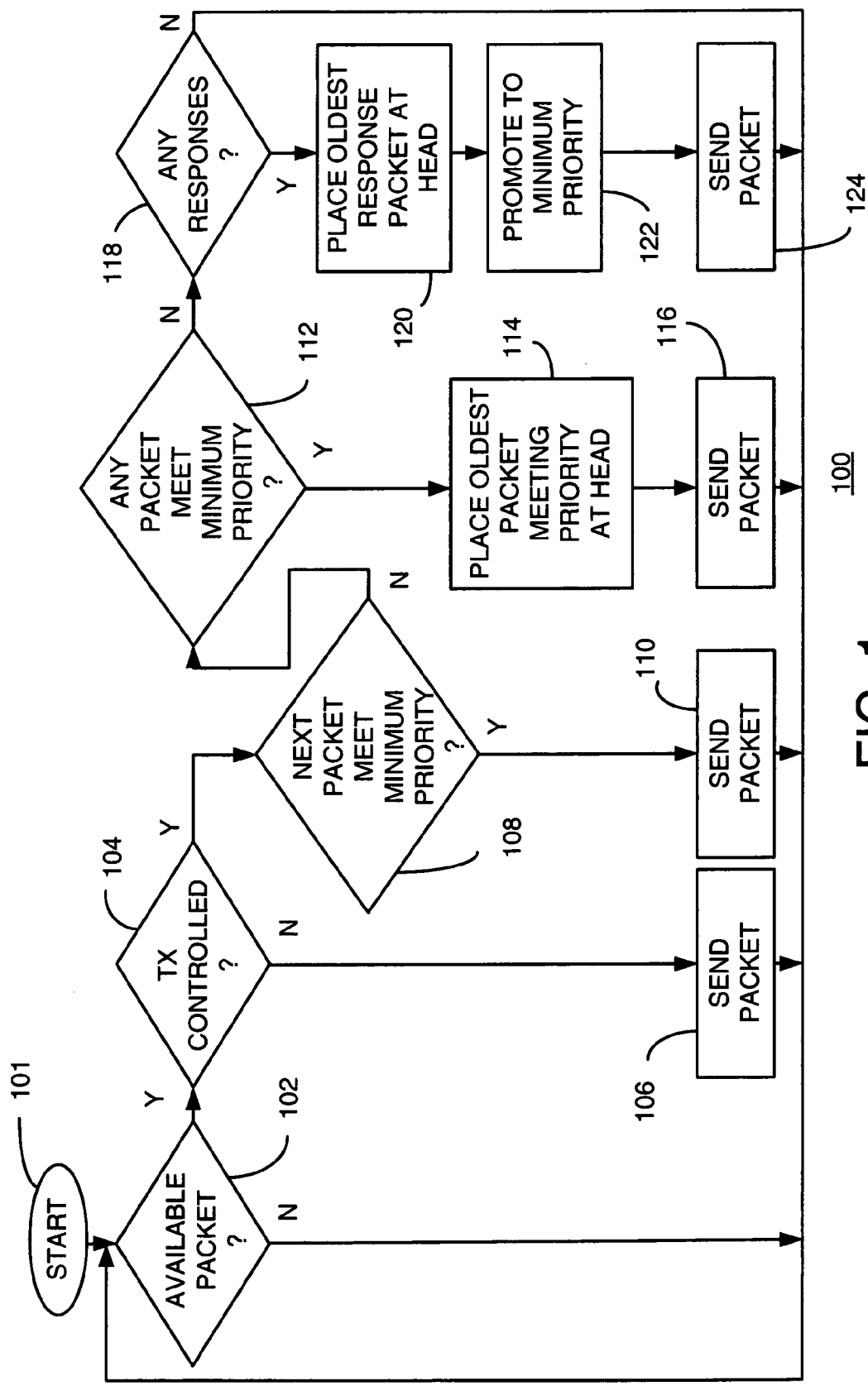
FIG. 1 is a flow diagram depicting an algorithm for implementing transmitter-controlled flow control in the RAPIDIO standard.

The devices 202A and 202B communicate data and control information with one another through the ports 204A and 204B using a packet-switched point-to-point communication architecture, such as the RAPIDIO electronic communication architecture. Each of the transmitters 208A and 208B includes a memory 214 having a set of buffers 216 for storing packets to be transmitted, reshuffle logic 212 for implementing a transmitter-controlled flow control mechanism, such as the algorithm 100 of FIG. 1, and control logic 218 for controlling the memory 214 and the reshuffle logic 212. Operation of the transmitters 208 is described below with respect to the reshuffle logic shown in FIG. 3.

Figure 3:
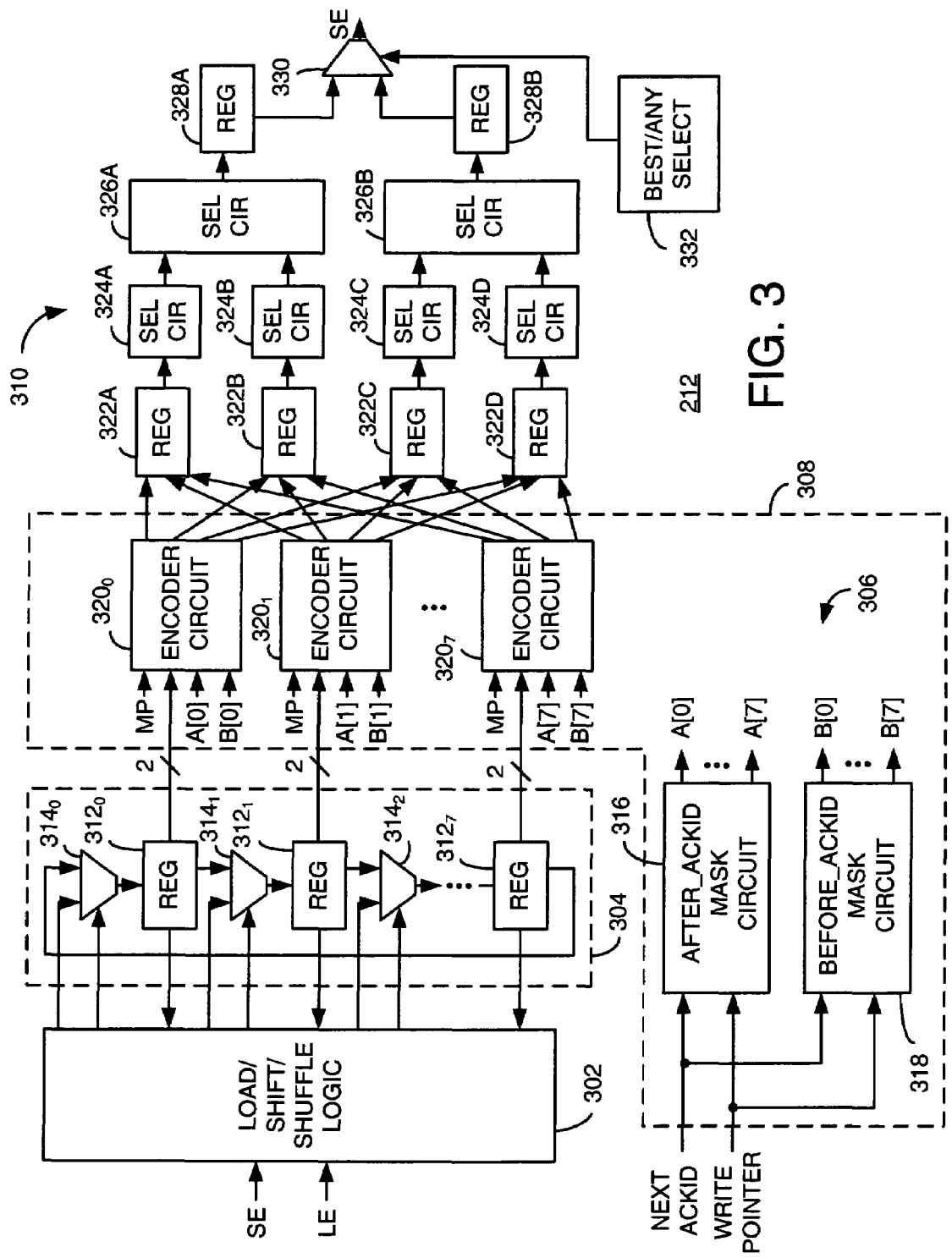
FIG. 3 is a block diagram depicting an exemplary embodiment of reshuffle logic of FIG. 2 in accordance with the invention.

FIG. 3 is a block diagram depicting an exemplary embodiment of the reshuffle logic 212 of FIG. 2 in accordance with the invention. The reshuffle logic 212 comprises load/shift/shuffle logic 302, circular shift register logic 304, encoder logic 308, and selection logic 310. In the present embodiment, the circular shift register logic 304 includes registers $312_0$ through $312_7$ (collectively referred to as registers 312) and multiplexers $314_0$ through $314_7$ (collectively referred to as multiplexers 314). As described below, there is a one-to-one correspondence between the registers 312 the buffers in the buffer set 216. For purposes of clarity by example, the present embodiment is described with respect to 8 registers that correspond to 8 buffers. It is to be understood, however, that the reshuffle logic 212 is scalable such that, in general, there can be N registers that correspond to N buffers, where N is an integer greater than one.

The encoder logic 308 includes an encoder circuit for each of the registers 312 (encoder circuits $320_0$ through $320_7$, collectively referred to as encoder circuits 320). The encoder logic 308 also includes an After_Ackid mask circuit 316 and a Before_Ackid mask circuit 318 (collectively referred to as mask logic 306). The selection logic 310 includes registers 322A through 322D (collectively referred to as registers 322), select circuits 324A through 324D (collectively referred to as select circuits 324), select circuits 326A and 326B (collectively referred to as select circuits 326), registers 328A and 328B (collectively referred to as registers 328), and a multiplexer 330.

Input ports of the registers $312_0$ through $312_7$ are driven by output ports of the multiplexers $314_0$ through $314_7$, respectively. For each register $312_i$ where $0 \leq i \leq 6$, an output port of the register $312_i$ provides a data signal to a first input port of each multiplexer $314_{i+1}$. An output port of the register $312_7$ provides a data signal to a first input port of the multiplexer $314_0$ (i.e., the registers 312 are coupled in circular fashion through the multiplexers 314). The output ports of the registers 312 also provide the data signals to input ports of the load/shift/shuffle logic 302. The output ports of the registers $312_0$ through $312_7$ provide data signals to first input ports of the encoder circuits $320_0$ through $320_7$, respectively.

Second input ports of the multiplexers 314 are driven by first output ports of the load/shift/shuffle logic 302. Selection ports of the multiplexers 314 are driven by second output ports of the load/shift/shuffle logic 302. Input ports of the After_Ackid mask circuit 316 and a Before_Ackid mask circuit 318 receive a Next_Ackid signal and a Write_Pointer signal, respectively. The After_Ackid mask circuit 316 produces eight After_Ackid signals denoted A[0] through A[7] (i.e., one for each of the registers 312). The signals A[0] through A[7] collectively provide an 8-bit After_Ackid mask signal. The Before_Ackid mask circuit 318 produces eight Before_Ackid signals denoted B[0] through B[7] (i.e., one for each of the registers 312). The signals B[0] through B[7] collectively provide an 8-bit Before_Ackid mask signal.

Second input ports of the encoder circuits $320_0$ through $320_7$ receive the signals A[0] through A[7], respectively. Third input ports of the encoder circuits $320_0$ through $320_7$ receive the signals B[0] through B[7], respectively. Fourth input ports of the encoder circuits 320 receive a minimum priority signal denoted MP. Each of the encoder circuits 320 includes four output ports coupled to the registers 322A through 322D, respectively. Output ports of the registers 322A through 322D are coupled to input ports of the select circuits 324A through 324D, respectively. Output ports of the select circuits 324A and 324B are respectively coupled to input ports of the select circuit 326A. Output ports of the select circuits 324C and 324D are respectively coupled to input ports of the select circuit 326B.

An output port of the select circuit 326A is coupled to an input port of the register 328A, and an output port of the select circuit 326B is coupled to an input port of the register 328B. Output ports of the registers 328 are respectively coupled to input ports of the multiplexer 330. An output port of the multiplexer 330 provides a Shuffle_Entry signal, denoted SE, to an input port of the load/shift/shuffle logic 302. Another input port of the load/shift/shuffle logic 302 receives a Load-Entry signal, denoted LE. A control port of the multiplexer 330 is coupled to an output port of a best/any select circuit 332.

Referring to FIGS. 2 and 3, in the present embodiment, there are 8 buffers in the buffer set 216 for storing 8 packets to be transmitted. As described above, each of the packets is of a particular type (e.g., response or request) and has a particular priority (e.g., priorities ranging from zero to three). Each of the registers 312 is configured to store a pointer. For each register $312_i$, the pointer stored therein comprises an address value associated with the ith buffer in the buffer set 216, a priority value assigned the packet stored in the ith buffer, and a type of the packet stored in the ith buffer.

For example, if the priority values range from zero to three, and if there are two packet types, then each of the registers 312 is configured to store three bits to represent the address value (0 through 7), two bits to represent the priority value (0 through 3), and one bit to represent the packet type (request/response). Each of the registers 312 is assigned a static index (referred to as an ack_id) that ranges between 0 and 7. For each register $312_\#$, the index is referred to as ack_id# (e.g., the register $312_5$ is assigned ack_id5).

The control logic 218 maintains the Next_Ackid signal, the Write_Pointer signal, and the MP signal. The Next_Ackid signal (also referred to as Next_Ackid) includes the ack_id of the register having the pointer to be read for transmission ("head pointer"). That is, Next_Ackid points to the register having the pointer to be read for transmission. The Next_Ackid signal increments through the registers 312 from ack_id0 through ack_id7 and back to ack_id0. The Write_Pointer signal (also referred to as Write_Pointer) increments through the registers 312 as new pointers are written to the circular shift register logic 304. The Write_Pointer points to the register that last stored a pointer. The pointer referenced by Write_Pointer is the "tail pointer."

As the Next_Ackid signal increments through the registers 312, the reshuffle logic 212 determines if the pointer in the register pointed to (i.e., the head pointer) meets the requirements for transmission. For example, in accordance with the flow control mechanism of FIG. 1, the head pointer must have a priority value greater than or equal to the minimum priority. If not, the reshuffle logic 212 determines the best available pointer in the circular shift register logic 304 for transmission (using the algorithm 100). If a best available pointer is located, that pointer is placed into the register pointed to by Next_Ackid (i.e., the best available pointer becomes the new head pointer).

The registers between and including the register that stored the former head pointer and the register above the register that stored the best available pointer are shifted down by one. For example, if Next_Ackid points to the register $312_5$, and if the best available pointer is located in the register $312_0$, then the pointer in the register $312_5$ is shifted into the register $312_6$, the pointer in the register $312_6$ is shifted into the register $312_7$, and the pointer in register $312_7$ is shifted into the register $312_0$. The pointer in register $312_0$ (before the shift of pointer in register $312_7$ into the register $312_0$) is reshuffled into the register $312_5$, which is pointed to by Next_Ackid. Operation of the reshuffle logic 212 to determine if a pointer in the current register (i.e., the head pointer) meets the requirements for transmission may be understood with reference to the flow diagram of FIG. 4.

The interaction between the load/shift/shuffle logic 302 and the circular shift register logic 304 is as follows. Through the multiplexers 314, each of the registers 312 may receive input from either another one of the registers 312 or the load/shift/shuffle logic 302. A register will receive data from the load/shift/shuffle logic 302 either when Write_Pointer points to the register and a new pointer is to be stored (i.e., the LE signal), or when Next_Ackid pointes to the register and another pointer is being shuffled thereto (i.e., the SE signal). A register will receive data from another register if the register is between Next_Ackid and a reshuffled entry during reshuffling. The load/shift/shuffle logic 302 controls the loading, reading, shifting, and shuffling and may comprise combinatorial logic.

Figure 4:
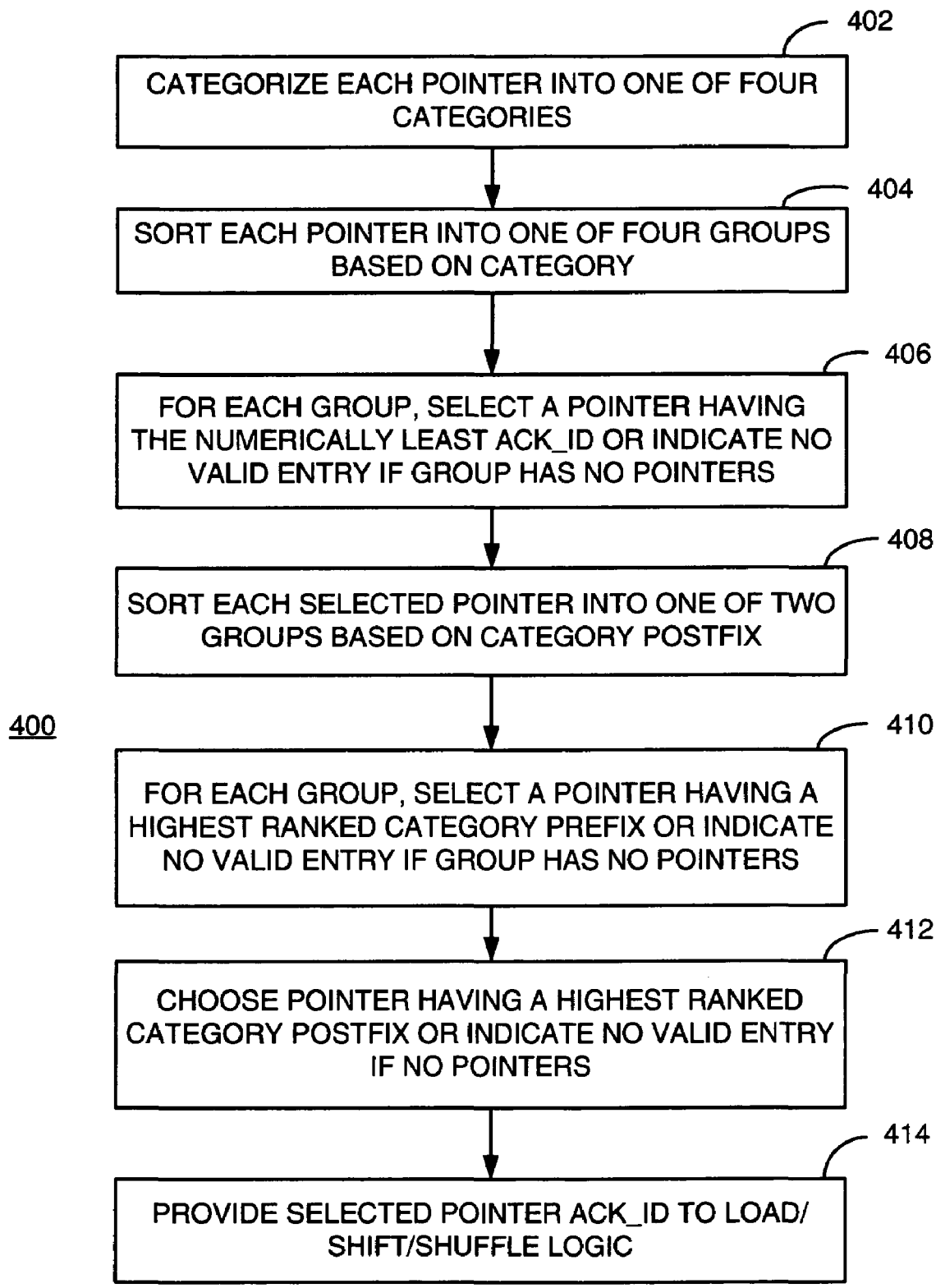
FIG. 4 is a flow diagram depicting a method of operation of the reshuffle logic of FIG. 3.

FIG. 4 is a flow diagram depicting a method 400 of operation of the reshuffle logic 212 of an embodiment of the invention. The method 400 begins at step 402, where each pointer in the circular shift register logic 304 is categorized into one of four categories based on both the position of the pointer among the registers 312 with respect to Next_Ackid and Write_Pointer, as well as the priority/type of the pointer. In the following description, the ack_id of a pointer is the ack_id of the register storing the pointer.

Notably, each of the pointers can be categorized in accordance with the following categories:

1) After_Ackid_Best—indicates that the pointer has: (a) a priority value greater than or equal to the minimum priority, and (b) an ack_id numerically greater than or equal to Next_Ackid and either the ack_id is less than Write_Pointer or Write_Pointer is less than Next_Ackid;
2) Before_Ackid_Best—indicates that the pointer has: (a) a priority value greater than or equal to the minimum priority, and (b) an ack_id numerically less than Next_Ackid and less than or equal to Write_Pointer;
3) After_Ackid-Any—indicates that the pointer has: (a) a response type, and (b) an ack_id numerically greater than or equal to Next_Ackid and either the ack_id is less than Write_Pointer or Write_Pointer is less than Next_Ackid;
4) Before_Ackid-Any—indicates that the pointer has: (a) a response type, and (b) an ack_id numerically less than Next_Ackid and less than or equal to Write_Pointer.

From the four categories listed above, it can be seen that there are two types of category prefixes (i.e., After_Ackid and Before_Ackid) and two types of category postfixes (i.e., Best and Any). Each pointer having an After_Ackid category prefix has an ack_id numerically greater than or equal to Next_Ackid and either the ack_id is less than Write_Pointer or Write_Pointer is less than Next_Ackid. Each pointer having a Before_Ackid category prefix has an ack_id numerically less than Next_Ackid and less than or equal to Write_Pointer. Each pointer having a Best category postfix has a priority value greater than or equal to the minimum priority. Each pointer having an Any category postfix has a response type.

The After_Ackid mask circuit 316 produces a high signal for each pointer having the After_Ackid category prefix (e.g., if the pointer in the register $312_5$ satisfies the After_Ackid requirement, the signal A[5] is set). The Before_Ackid mask circuit 318 produces a high signal for each pointer having the Before_Ackid category prefix (e.g., if the pointer in the register $312_3$ satisfies the Before_Ackid requirement, the signal A[3] is set).

Each encoder circuit $320_i$ processes the minimum priority, the priority of the pointer in the register $312_i$, the type of the pointer in the register $312_i$, the bit A[i] from the After_Ackid mask circuit 316, and the bit B[i] from the Before_Ackid mask circuit 318. Each of the encoder circuits 320 in turn produces a 4-bit value from the input data. In a given 4-bit value, the first bit corresponds to the After_Ackid_Best category, the second bit corresponds to the Before_Ackid_Best category, the third bit corresponds to the After_Ackid_Any category, and the fourth bit corresponds to the Before_Ackid_-Any category.

Figure 5:
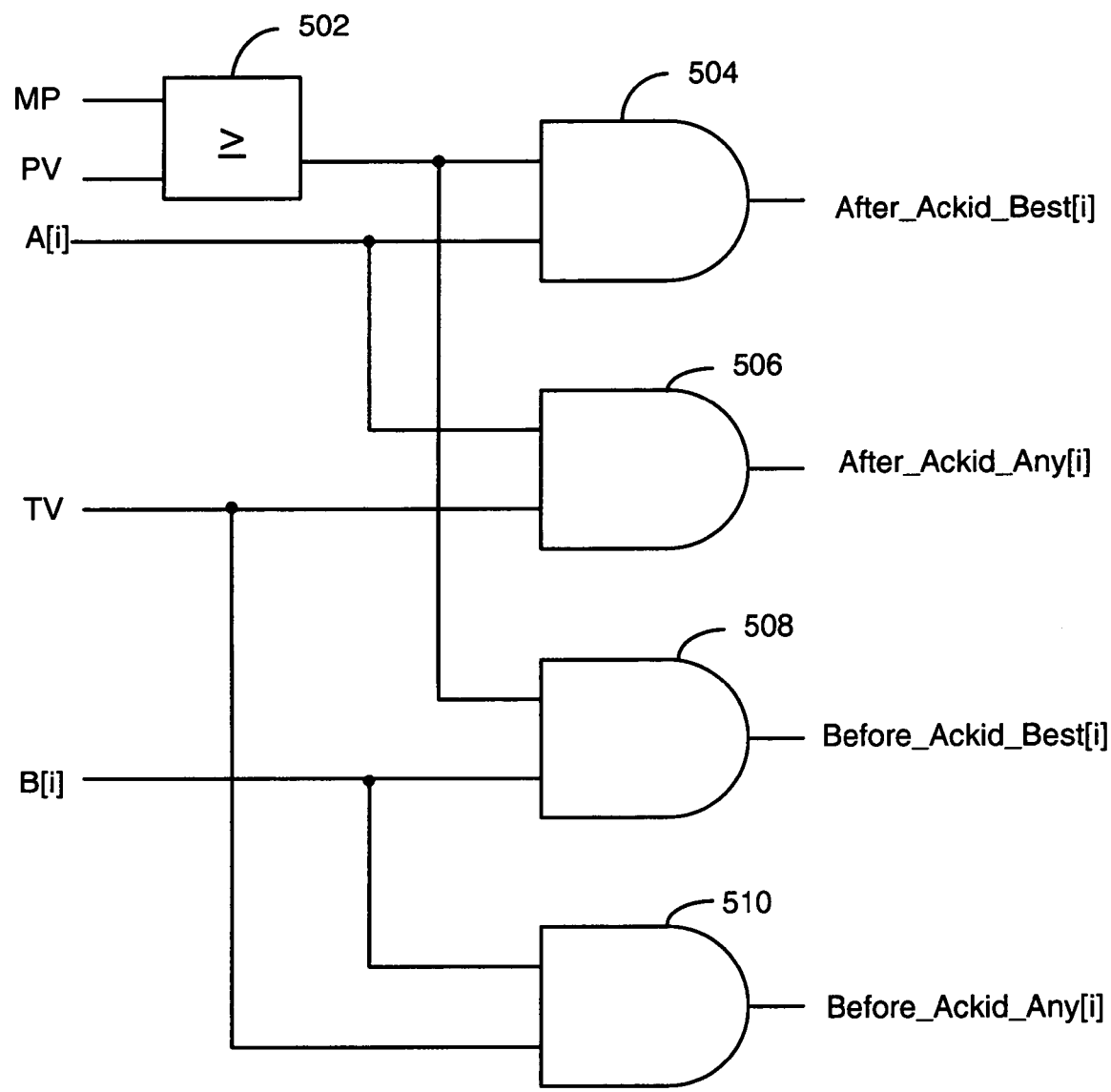
FIG. 5 is a block diagram depicting an exemplary embodiment of an encoder circuit of FIG. 3 constructed in accordance with the invention.

In particular, FIG. 5 is a block diagram depicting an exemplary embodiment of an encoder circuit $320_i$ constructed in accordance with the invention. The encoder circuit $320_i$ comprises a comparison block 502 and AND gates 504, 506, 508, and 510. Input ports of the comparison block 502 receive the minimum priority signal and the priority value from the register $312_i$ (PV). An output port of the comparison block 502 drives a first input port of the AND gate 504 and a first input port of the AND gate 508. A second input port of the AND gate 504 receives the signal A[i] from the After_Ackid mask circuit 316. The AND gate 504 provides the signal After_Ackid_Best[i], which is the first bit in the 4-bit value produced by the encoder circuit $320_i$.

A second input port of the AND gate 508 receives the signal B[i] from the Before_Ackid mask circuit 318. The AND gate 508 provides the signal Before_Ackid_Best[i], which is the second bit in the 4-bit value produced by the encoder circuit $320_i$. Input ports of the AND gate 506 respectively receive the signal A[i] and the type value from the register $312_i$ (TV). The AND gate 506 provides the signal After_Ackid_Any[i], which is the third bit in the 4-bit value produced by the encoder circuit $320_i$. Input ports of the AND gate 510 respectively receive the signal B[i] and the type value from the register $312_i$. The AND gate 510 provides the signal Before_Ackid_Any[i], which is the third bit in the 4-bit value produced by the encoder circuit $320_i$.

Returning to FIGS. 3 and 4, the method 400 proceeds from step 402 to step 404. At step 404, each of the pointers in the circular shift register logic 304 is sorted into one of four groups based on category. That is, a group of After_Ackid_Best pointers is formed, a group of After_Ackid_Any pointers is formed, a group of Before_Ackid_Best pointers is formed, and a group of Before_Ackid_Any pointers is formed. Note that a given group may not have any pointers.

Notably, the bits of each 4-bit value produced by the encoder circuits 320 are divided among the registers 322. The first bit in each 4-bit value is stored in the register 322A, the second bit in the register 322B, the third bit in the register 322C, and the fourth bit in the register 322D. Note that each of the registers 322 is associated with a particular category and stores eight bits in order of ack_id# (e.g., the first bit stored in each of the registers 322 is associated with the register $312_0$ and so on). The ith bit in a register 322X (X being between A and D) is set if the pointer in the register $312_i$ is in the category of the register 322X. Conversely, the ith bit in a register 322X is unset if the pointer in the register $312_i$ is not in the category of the register 322X.

At step 406, for each of the four groups, a pointer is selected having the numerically least ack_id or no valid entry is indicated if the group has no pointers. Notably, each of the select circuits 324A through 324D selects a "topmost" set bit from the registers 322A through 322D, respectively and outputs the ack_id of the pointer associated with the topmost set bit. In each of the registers 322, the topmost set bit corresponds to the pointer having the numerically least ack_id. For each registers 322A through 322D, if there are not set bits, the corresponding one of the select circuits 324A through 324D indicates that there is no valid entry.

At step 408, each pointer selected at step 406 is sorted into one of two groups based on category postfix. That is, a group is formed for the Best category postfix and the Any category postfix. At step 410, for each group, a pointer is selected having a highest ranked category prefix or no valid entry is indicated if the group has no pointers. Notably, the category prefix After_Ack_id has a higher rank that the category prefix Before_Ack_id. The select circuit 326A processes the output of both the select circuit 324A and the select circuit 324B and outputs the ack_id produced by the select circuit 324A if valid. Otherwise, the select circuit 326A outputs the ack_id produced by the select circuit 324B if valid. If there is not valid ack_id output by either of the select circuits 324A and 324B, then the select circuit 326A indicates that there is no valid entry. Likewise, the select circuit 326B processes the output of both the select circuit 324C and the select circuit 324D and outputs the ack_id produced by the select circuit 324C if valid. Otherwise, the select circuit 326B outputs the ack_id produced by the select circuit 324D if valid. If there is not valid ack_id output by either of the select circuits 324C and 324D, then the select circuit 326B indicates that there is no valid entry.

At step 412, a pointer is chosen from the pointers selected at step 410 having a highest ranked category postfix or no valid entry is indicated if there are no pointers selected at step 410. Notably, the ack_id values output by each of the select circuits 326A and 326B are stored in the registers 328A and 328B, respectively. The best/any select circuit 332 determines whether a pointer having the Best category postfix or the pointer having the Any category postfix is selected in accordance with the algorithm of FIG. 1. A category postfix of Best is ranked higher than a category postfix of Any. Thus, a pointer stored in the register 328A will be chosen over a pointer stored in the register 328B. At step 414, the multiplexer 330 provides the selected ack_id to the load/shift/shuffle logic 302 via the signal SE. The load/shift/shuffle logic 302 uses the selected ack_id to shuffle and shift the pointers in the circular shift register logic 304, as described above.

Example of Operation

Suppose there are eight buffers in the buffer set 216. Suppose that after some time, with packets being sent and buffered, that the current state of the circular shift register logic 304 is shown in Table 1.

TABLE 1

| ack_id | Pointer | Priority | Type | Status |
|---|---|---|---|---|
| 0 | 6 | 2 | Request | |
| 1 | 1 | 3 | Response | |
| 2 | 3 | 1 | Response | Write_Pointer (tail) |
| 3 | 3 | 0 | Request | NOT VALID |
| 4 | 6 | 0 | Request | NOT VALID |
| 5 | 0 | 1 | Request | Next_Ackid (head) |
| 6 | 2 | 1 | Response | |
| 7 | 5 | 0 | Request | |

In Table 1, ack_id refers to the ack_id of the register storing the pointer, the pointer refers to the index of the buffer in the buffer set 216, the priority values range from 0 through 3, the types are either request or response, Next_Ackid points to the register $312_5$, and Write_Pointer points to the register $312_2$. Note that the pointers in registers $312_3$ and $312_4$ are not valid (i.e., there are 6 pending packets to transmit, starting with ack_id 5 and wrapping around to ack_id 2). The next packet scheduled to be sent is the packet pointed to by the pointer having ack_id 5, the packet being physically stored in the buffer number 0 in the buffer set 216. Assume that the transmitter has calculated that the minimum priority is 2 (transmitter-controlled flow is enabled).

In such a case, the pointer in the register $312_5$ is insufficient for transmission (its priority is 1) and the reshuffle logic 212 must determine where (if any) the best pointer for transmission is located. The registers 322A through 322D will store the following:

Register 322A (After_Ackid_Best 0:7)=[0000 0000];

Register 322B (Before_Ackid_Best 0:7)=[1100 0000];

Register 322C (After_-Ackid_-Any 0:7)=[0000 0010]; and

Register 322D (Before_Ackid_Any 0:7)=[0110 0000].

The results having the Best category postfix are all pointers that meet minimum priority, and the results having the Any category postfix are all pointers of response type. The results having the After_Ackid category prefix are masked to only permit ack_ids numerically greater than Next_Ackid, and the results having the Before_Ackid category prefix are masked to only permit ack_ids numerically less than Next_Ackid.

Selecting the topmost set bit (numerically smallest ack_id) result from the registers 322 will yield the oldest pointer in each:

[0000 0000];
[1000 0000];
[0000 0010]; and
[0100 0000].

Selecting the After_Ackid category prefix over the Before_Ackid category prefix, if there are any, will give the oldest over pointers having the Best category postfix and the Any category postfix.

[1000 0000]; and
[0000 0010].

Note that the After_Ackid entries are older than the Before_Ackid entries, since the Before_Ackid entries represent entries created because the Write_Pointer has wrapped around the circular shift register logic 304.

Thus, there is a pointer that meets the minimum priority at ack_id0, and the nearest pointer of response type is at ack_id6. The best/any select circuit 332 chooses the pointer having the ack_id0 and the pointers are reshuffled to place the pointer at ack_id0 to ack_id5, and shift the pointers at ack_id5, ack_id6, and ack_id7 to ack_id6, ack_id7, and ack_id0, respectively. The transmitter now has a valid pointer for transmission. The resulting state of the circular shift register logic 304 is shown in Table 2.

TABLE 2

| ack_id | Previous State | Pointer | Priority | Type | Status |
|---|---|---|---|---|---|
| 0 | was 7 | 5 | 0 | Request | |
| 1 | same | 1 | 3 | Response | |
| 2 | same | 3 | 1 | Response | Write_Pointer (tail) |
| 3 | same | 3 | 0 | Request | NOT VALID |
| 4 | same | 6 | 0 | Request | NOT VALID |
| 5 | was 0 | 6 | 2 | Request | Next_Ackid (head) |
| 6 | was 5 | 0 | 1 | Request | |
| 7 | was 6 | 2 | 1 | Response | | that only the pointer selected by the multiplexer 330 is reshuffled. No other entries are pulled to be reshuffled (although several must be shifted to make room for the reshuffled entry).

Figure 6:
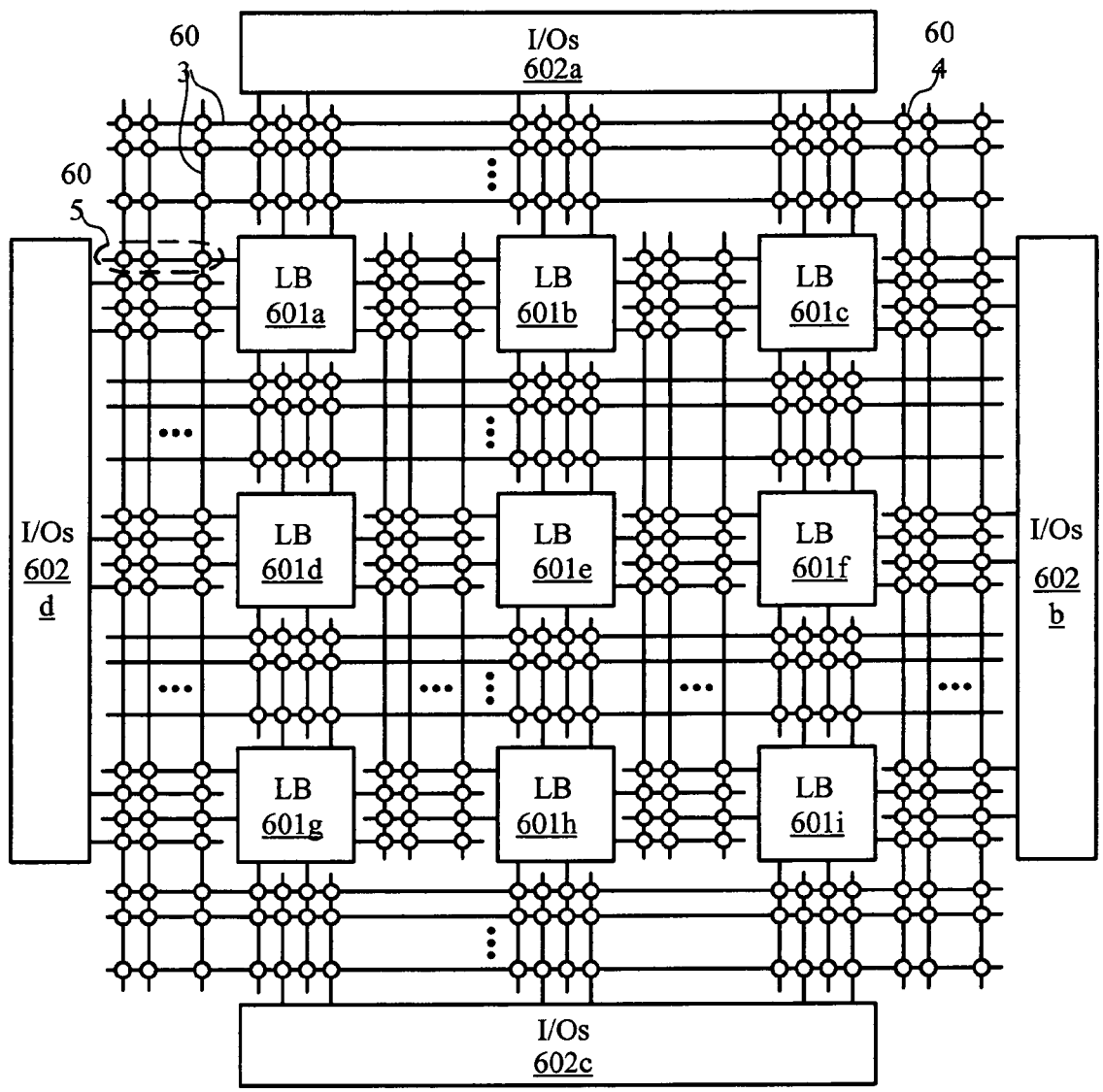
FIG. 6 is a block diagram depicting an exemplary embodiment of an FPGA in which the present invention may be employed.

The reshuffle logic 212 of an embodiment of the invention may be implemented using a programmable logic device (PLD), such as a field programmable gate array (FPGA). Notably, FIG. 6 is a block diagram depicting an exemplary embodiment of an FPGA 600 in which the present invention may be employed. The FPGA 600 includes an array of configurable logic blocks (LBs 601a-601i, collectively LBs 601) and programmable input/output blocks (I/O blocks 602a-602d, collectively I/O blocks 602). The LBs 601 and the I/O blocks 602 are interconnected by a programmable interconnect structure that includes a large number of interconnect lines 603 interconnected by programmable interconnect points (PIPs 604, shown as small circles). Some of the PIPs 604 are often coupled into groups (e.g., group 605) that implement multiplexer circuits selecting one of several interconnect lines to provide a signal to a destination interconnect line or logic block. Some FPGAs also include additional logic blocks with special purposes (not shown), e.g., delay locked loops (DLLs), random access memory (RAM), and the like.

As is well known in the art, the LBs 601, I/O blocks 602, and the programmable interconnect structure may be configured to perform a variety of functions. Some or all of the LBs 601 may include one or more "slices" and programmable interconnect circuitry. Each LB slice includes various circuits, such as flip-flops, function generators (e.g., a look-up tables (LUTs)), logic gates, memory, and like type well-known circuits. The LBs 601, I/O blocks 602, and the programmable interconnect structure are typically programmed by loading a stream of configuration data into internal configuration memory cells (not shown) that define how the programmable elements are configured. The configuration process of the FPGA 600 is also well known in the art. One such FPGA that may be used with the invention, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference. The reshuffle logic 212 may be implemented using the programmable logic of the FPGA 600.

Packet reshuffler and method of implement the same has been described. One exemplary embodiment of the invention provides a mechanism to arrange the transmission order of packets in a transmitter by advantageously managing an array of pointers to the packets. The embodiment utilizes a masking scheme to determine candidate pointers for reorganization, and a circular shift register that can selectively shift a portion of its entries to accomplish the reorganization. The reshuffle logic of the embodiment is capable of handling a constant stream of packets without stalling in high-speed applications.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. In a transmitter for sending packets stored in a set of buffers, a digital logic circuit, comprising:
    circular shift register logic including a plurality of registers configured to respectively store a plurality of pointers, each of said plurality of pointers including an address of a buffer in said set of buffers, a priority value, and a type value;
    encoder logic configured to produce a plurality of sets of bits respectively associated with said plurality of pointers;
    selection logic configured to process said plurality of sets of bits to generate a shuffle entry signal associated with a selected one of said plurality of pointers; and
    combinatorial logic configured to control said circular shift register logic in response to said shuffle entry signal.

2. The digital logic circuit of claim 1, wherein said circular shift register logic further comprises:
    a plurality of multiplexers, each of said plurality of multiplexers having a first input terminal coupled to a register of said plurality of registers, a second input terminal coupled to said combinatorial logic, and an output terminal coupled to another register of said plurality of registers.

3. The digital logic circuit of claim 1, wherein said encoder logic comprises:
    a first mask circuit configured to produce a first plurality of mask bits in response to a head signal associated with a head pointer of said plurality of pointers and a tail signal associated with a tail pointer of said plurality of pointers;

a second mask circuit configured to produce a second plurality of mask bits in response to said head signal and said tail signal; and a plurality of encoder circuits, each of said plurality of encoder circuits configured to process said priority value and said type value of a respective one of said plurality of pointers, a respective one of said first plurality of mask bits, a respective one of said second plurality of mask bits, and a minimum priority signal to generate a respective one of said plurality of sets of bits.

4. The digital logic circuit of claim 3, wherein each of said plurality of encoder circuits is configured to generate said respective one of said plurality of sets of bits in response to a plurality of conditions.

5. The digital logic circuit of claim 3, wherein each of said plurality of encoder circuits comprises:
a comparison circuit; and
a plurality of logic gates.

6. The digital logic circuit of claim 1, wherein said selection logic comprises:
first registers for storing said plurality of sets of bits;
first select circuits in communication with said first registers;
second select circuits in communication with said first select circuits;
second registers in communication with said second select circuits; and
a multiplexer in communication with said second registers and said combinatorial logic.

7. The digital logic circuit of claim 6, further comprising:
a third select circuit for controlling said multiplexer.

8. The digital logic circuit of claim 1, wherein said circular shift register logic, said encoder logic, said selection logic, and said combinatorial logic comprises programmable logic of a programmable logic device.

9. In a transmitter for sending packets stored in a set of buffers, a method, comprising:
storing a plurality of pointers in a respective plurality of registers organized as a circular shift register, each of said plurality of pointers including an address of a buffer in said set of buffers, a priority value, and a type value;
categorizing each of said plurality of pointers among a set of categories, each category in said set of categories having a prefix and a postfix;
processing said plurality of pointers to select a best pointer therefrom;
reshuffling at least one of said plurality of pointers from a first register of said plurality of registers to a second register of said plurality of registers in response to said best pointer;
wherein said step of processing comprises:
sorting each of said plurality of pointers among a first set of groups based on said category thereof;
processing each group in said first set of groups to select first pointers;
sorting said first pointers among a second set of groups based on said postfix of said category thereof;
processing each group in said second set of groups to select second pointers; and
processing said second pointers to produce said best pointer.

10. The method of claim 9, wherein said step of categorizing comprises:
receiving a head signal associated with a head pointer of said plurality of pointers;
receiving a tail signal associated with a tail pointer of said plurality of pointers;

receiving a minimum value signal; and
producing a plurality of sets of bits respectively associated with said plurality of pointers in response to said head signal, said tail signal, said minimum value signal, and said priority value and said type value of a respective one of said plurality of pointers.

11. The method of claim 10, wherein said step of categorizing further comprises:
producing a first plurality of mask bits in response to said head signal and said tail signal; and
producing a second plurality of mask bits in response to said head signal and said tail signal.

12. The method of claim 10, wherein, for each set of bits in said plurality of sets of bits, bits in said set of bits are respectively associated with categories in said set of categories.

13. A transmitter for transmitting packets, comprising:
a memory having a set of buffers for storing said packets;
reshuffle logic, including:
circular shift register logic including a plurality of registers configured to respectively store a plurality of pointers, each of said plurality of pointers including an address of a buffer in said set of buffers, a priority value, and a type value;
encoder logic configured to produce a plurality of sets of bits respectively associated with said plurality of pointers;
selection logic configured to process said plurality of sets of bits to generate a shuffle entry signal associated with a selected one of said plurality of pointers; and
combinatorial logic configured to control said circular shift register logic in response to said shuffle entry signal; and
control logic for processing a pointer in said plurality of pointers for transmission of a packet in said packets.

14. The transmitter of claim 13, wherein said circular shift register logic further comprises:
a plurality of multiplexers, each of said plurality of multiplexers having a first input terminal coupled to a register of said plurality of registers, a second input terminal coupled to said combinatorial logic, and an output terminal coupled to another register of said plurality of registers.

15. The transmitter of claim 13, wherein said control logic is configured to maintain a head signal associated with a head pointer of said plurality of pointers, a tail signal associated with a tail pointer of said plurality of pointers, and a minimum priority signal, and wherein said encoder logic comprises:
a first mask circuit configured to produce a first plurality of mask bits in response to said head signal and said tail signal;
a second mask circuit configured to produce a second plurality of mask bits in response to said head signal and said tail signal; and
a plurality of encoder circuits, each of said plurality of encoder circuits configured to process said priority value and said type value of a respective one of said plurality of pointers, a respective one of said first plurality of mask bits, a respective one of said second plurality of mask bits, and said minimum priority signal to generate a respective one of said plurality of sets of bits.

16. The transmitter of claim 15, wherein each of said plurality of encoder circuits is configured to generate said respective one of said plurality of sets of bits in response to a plurality of conditions.

17. The transmitter of claim 13, wherein said selection logic comprises:
first registers for storing said plurality of sets of bits;

first select circuits in communication with said first registers;
second select circuits in communication with said first select circuits;
second registers in communication with said second select circuits; and
a multiplexer in communication with said second registers and said combinatorial logic.

18. The transmitter of claim 17, further comprising:
a third select circuit for controlling said multiplexer.

19. The transmitter of claim 13, wherein said circular shift register logic, said encoder logic, said selection logic, and said combinatorial logic comprises programmable logic of a programmable logic device.

* * * * *